(No Model.)
W. E. THOMPSON.
SPRING FORK FOR BICYCLES.
No. 461,001. Patented Oct. 13, 1891.
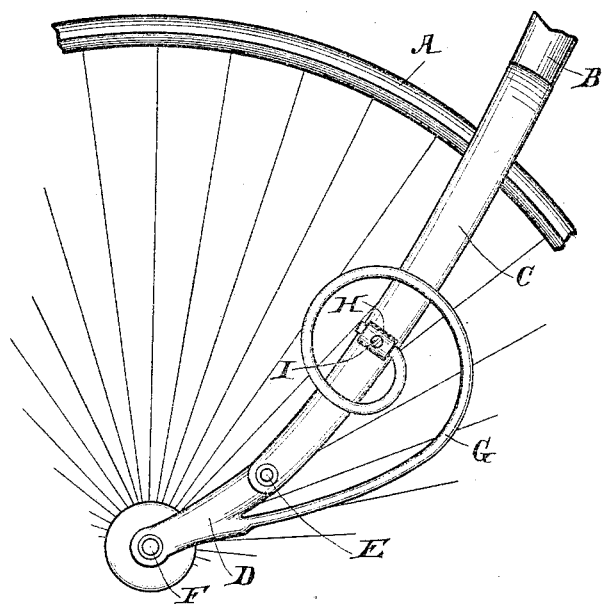
Witnesses.
C. H. Keeney.
Anna V. Faust.
Inventor.
William E. Thompson
By Curtis T. Benedict
Attorney.

UNITED STATES PATENT OFFICE.

WILLIAM E. THOMPSON, OF MILWAUKEE, WISCONSIN.

SPRING-FORK FOR BICYCLES.

SPECIFICATION forming part of Letters Patent No. 461,001, dated October 13, 1891.

Application filed March 16, 1891. Serial No. 385,233. (No model.)

*To all whom it may concern:*

Be it known that I, WILLIAM E. THOMPSON, of Milwaukee, in the county of Milwaukee and State of Wisconsin, have invented a new and useful Improvement in Bicycles, of which the following is a description, reference being had to the accompanying drawing, which is a part of this specification.

My invention relates to improvements in the fork and allied parts of a bicycle for which Letters Patent of the United States No. 447,382 were issued to me on March 3, 1891.

The object of my invention is an improved form of construction of the fork and those parts, the novel features of which will be hereinafter claimed.

The drawing represents a fragment of a bicycle-wheel and so much of the fork supported thereon as is necessary to illustrate my improved device.

My improved device is adapted to be used with many forms of velocipedes; but is especially desirable in those bicycles in which two wheels of substantially the same size are used and in which the front end of the backbone or perch is supported on a wheel-straddling fork.

In the drawing, A represents the forward wheel of a bicycle of the class mentioned, and the fork B is bifurcate in its lower portion, straddling the wheel A, one leg only of which furcate part is shown in the drawing, as the other leg is opposite thereto, and is in all respects substantially like the one shown in the drawing. Each leg or furcate part of the fork is in two parts C and D. The two parts C and D are pivoted together at their joining extremities at E and together form the continuous leg of the fork, which at its lower extremity is supported on the axle F of the wheel A. A spring G, preferably volute in form, is constructed integrally with or is affixed at one end rigidly to the part D at a distance from the axle F and from the joint E, or, in other words, between the extremities of the part D. At the other extremity the spring G is secured rigidly, and preferably detachably, to the part C at a distance from the joint E. The spring G is conveniently secured to the part C by inserting the extremity of the spring in an eye or bracket H, fixed on the part C and securing the spring detachably therein by a set-screw I.

What I claim as new, and desire to secure by Letters Patent, is—

1. In a bicycle or similar vehicle, a supporting-fork the legs of which are formed in two parts pivoted together at their joining ends, forming substantially continuous legs, the lower extremity of the lower part of the legs being supported on the wheel-axle, and a spring one extremity of which is integral with the lower part of the leg between the axle and the pivotal connection with the upper part of the leg, the other extremity of which spring is secured to the upper part of the leg at a distance from its pivotal connection with the lower part of the leg and not otherwise, combined substantially as described.

2. The combination, substantially as described, of a wheel, an axle, a fork having legs in two parts jointed together medially, forming substantially continuous legs, and a volute spring secured rigidly to the lower part of the leg at a distance from the axle and at the other extremity secured detachably to the upper part of the leg at a distance from its pivotal connection with the lower portion of the leg and not elsewhere, as set forth.

In testimony whereof I affix my signature in presence of two witnesses.

WILLIAM E. THOMPSON.

Witnesses:
C. T. BENEDICT,
ANNA V. FAUST.